United States Patent [19]

Herscher

[11] Patent Number: 5,745,442
[45] Date of Patent: Apr. 28, 1998

[54] DIGITAL TIME INTERVAL MEASUREMENT ENGINE FOR A TIME OF FLIGHT SYSTEM

[75] Inventor: Bret A. Herscher, Cupertino, Calif.

[73] Assignee: Power Spectra, Inc., Sunnyvale, Calif.

[21] Appl. No.: 735,182

[22] Filed: Oct. 22, 1996

[51] Int. Cl.[6] .............................. G04F 8/00; G01S 13/18; G01C 3/08
[52] U.S. Cl. .............................. 368/118; 342/94; 342/103; 356/5.08
[58] Field of Search .............................. 368/10, 113–121; 342/94, 95, 135; 356/5.01–5.08

[56] References Cited

U.S. PATENT DOCUMENTS

| | | | |
|---|---|---|---|
| 4,620,788 | 11/1986 | Giger | 356/5 |
| 4,982,350 | 1/1991 | Perna et al. | 364/569 |
| 5,125,736 | 6/1992 | Vaninetti et al. | 356/5 |
| 5,148,175 | 9/1992 | Woolfolk | 342/95 |
| 5,333,162 | 7/1994 | Condreva | 377/20 |
| 5,570,326 | 10/1996 | Trystram | 368/113 |

Primary Examiner—Vit W. Miska
Attorney, Agent, or Firm—Burns, Doane, Swecker & Mathis, L.L.P.

[57] ABSTRACT

An exclusively digital timing engine that measures extremely short time intervals for use in time of flight systems such as laser range finding systems. This exclusively digital timing engine minimizes the use of high speed, high cost components by employing a novel time multiplexing scheme to execute each of the primary time of flight functions: frequency synthesis, range gating, and time of flight interval measurement. In addition, the timing engine incorporates a random time delay scheme which enhances the resolution of the time interval measurement.

26 Claims, 8 Drawing Sheets

DIGITAL TIME INTERVAL MEASUREMENT ENGINE FOR A TIME OF FLIGHT SYSTEM

BACKGROUND

The present invention relates to time of flight (TOF) measurement systems. More particularly, the present invention relates to a high speed, high resolution, time interval measurement engine for use in a TOF system, for example, a laser range finder system.

A laser range finder is a TOF system that directs a burst of energy (i.e., laser energy) towards a desired target. The energy strikes the target and then propagates back towards the laser range finder. The time required for the energy to travel from the laser range finder, to the desired target, and then back to the laser range finder is measured by the range finder and is used to determine the target's range (i.e., the line-of-sight distance from the range finder to the target).

There are range finders that use forms of energy other than laser energy. For example, some TOF systems use ultrasound, and other TOF systems use electrical impulses. However, laser-based TOF systems are more desirable when the application requires high range resolution. In many industrial applications, range resolutions of 0.25 inches or less are required. In order to achieve a range resolution of 0.25 inches, the TOF system must be capable of accurately measuring time intervals as small as 42 picoseconds.

Figure 7:
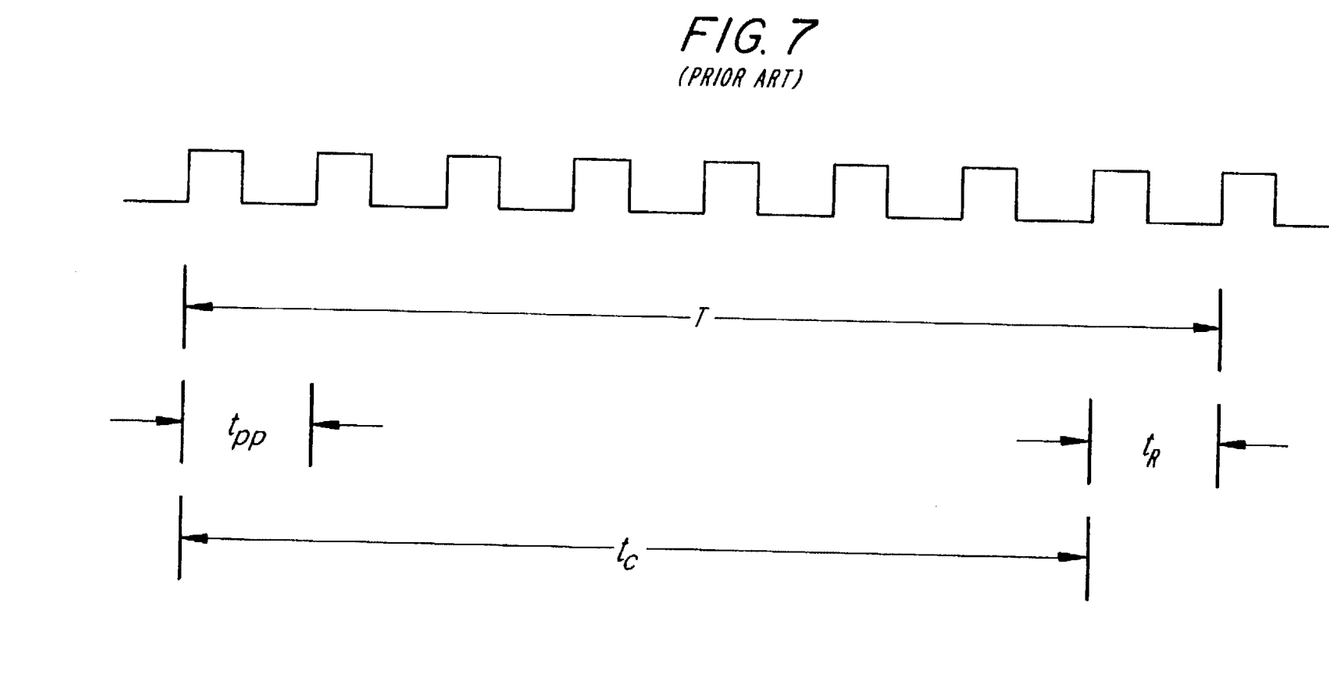
FIG. 7 is a timing diagram for measuring a time of flight interval in accordance with the prior art.

In order to accurately measure extremely small time intervals, for example, time interval T as illustrated in FIG. 7, some prior TOF systems divide the time interval T into a coarse time interval $t_c$, which is measured digitally, and a remainder time interval $t_r$, which is measured with an analog scheme.

In accordance with FIG. 7, the coarse time interval is measured by multiplying the number of pulses generated during the time interval T by the pulse-to-pulse interval $t_{pp}$ as shown in the following equation:

$$t_c = X * t_{pp} \quad (1)$$

wherein X represents the number of pulses generated during the time interval T.

The analog scheme for measuring the time interval $t_r$ typically employs a high speed analog interpolator (i.e., bandwidths on the order of 10 GHz). Analog interpolators are generally well known. They include an analog circuit for generating a rapidly rising, highly linear ramp signal and an analog-to-digital converter. The point on the highly linear ramp signal corresponding to the end of the time interval T is used to determine the time interval $t_r$. Time interval T, therefore, is equivalent to the sum of the coarse time interval $t_c$ plus the remainder time interval $t_r$.

Because analog interpolators operate at such high speed, they have a natural tendency to produce non-linearities. In addition, analog circuitry is more temperature dependent than digital devices. In other words, changes in temperature may significantly impact the ability of an analog interpolator to generate an accurate linear ramp signal. Of course, non-linearities will degrade the accuracy of the time interval measurement and, in turn, degrade the accuracy of the range-to-target measurement.

One way to overcome the above-identified problems associated with analog interpolators is to utilize an exclusively digital TOF measurement system. However, few digital devices operate at speeds capable of supporting such high speed applications. ECL devices operate at speeds which are capable of supporting such applications, but ECL logic is very expensive. In addition, the TOF system must perform other functions in addition to time interval measurement, for example, frequency synthesis and range gate computations, and the number of ECL devices that would be required to support an exclusively digital TOF system makes such an option cost prohibitive. Therefore, there is a tremendous need to develop an exclusively digital TOF system that is capable of measuring extremely small time intervals and perform all of the additional TOF functions with as few ECL devices as necessary so as to provide a relatively low cost product.

SUMMARY

Therefore, it is an object of the present invention to provide a high speed, high resolution time of flight interval measurement engine for a time of flight system, such as a laser range finder system.

It is another object of the present invention to provide an exclusively digital, high speed, high resolution time of flight interval measurement engine for a time of flight system.

It is yet another object of the present invention to provide an exclusively digital, high speed, high resolution time of flight interval measurement engine that minimizes the use of non-linear components and minimizes the use of high cost digital logic devices without compromising speed and resolution.

The present invention provides a TOF interval measurement engine which employs an entirely digital design and a high resolution, averaging technique for measuring TOF intervals. In addition, the present invention employs a novel time multiplexing scheme to execute each of the critical TOF measurement functions. By time multiplexing each of the critical TOF measurement functions, fewer high speed, costly, digital components are required. The present invention, when used in conjunction with a laser range finder, provides high range resolution measurements for industrial applications such as diameter measurements of material rolls, liquid and material level sensing, equipment collision avoidance and warning, container ship loading, speed and proximity sensing, manufacturing process monitoring, robotics and automation, safety monitoring, article profiling and dimensioning, and environmental monitoring.

The aforementioned and other objects of the invention are achieved by a method and apparatus for measuring a time interval, comprising the steps of using a counter in a first circuit to synthesize a measurement clock having a predetermined frequency; disconnecting the counter from the first circuit; applying the measurement clock to the counter and starting counter operation in response to a start signal; stopping counter operation in response to a stop signal; and using an output of the counter to measure the time interval between the start signal and the stop signal.

The aforementioned and other objects of the invention are also achieved by a method and apparatus for measuring a time interval, comprising the steps of synthesizing a measurement clock having a predetermined frequency; initializing a counter to a predetermined value representing a range gate delay; applying the measurement clock to the counter and starting counter operation in response to a start signal; stopping counter operation in response to a stop signal; and using an output of the counter to measure the time interval, wherein the step of stopping counter operation in response to the stop signal is inhibited until the output of the counter indicates expiration of the range gate delay.

BRIEF DESCRIPTION OF THE DRAWINGS

The objects and advantages of the invention will be understood by reading the following detailed description in conjunction with the drawings in which.

DETAILED DESCRIPTION

Figure 1:
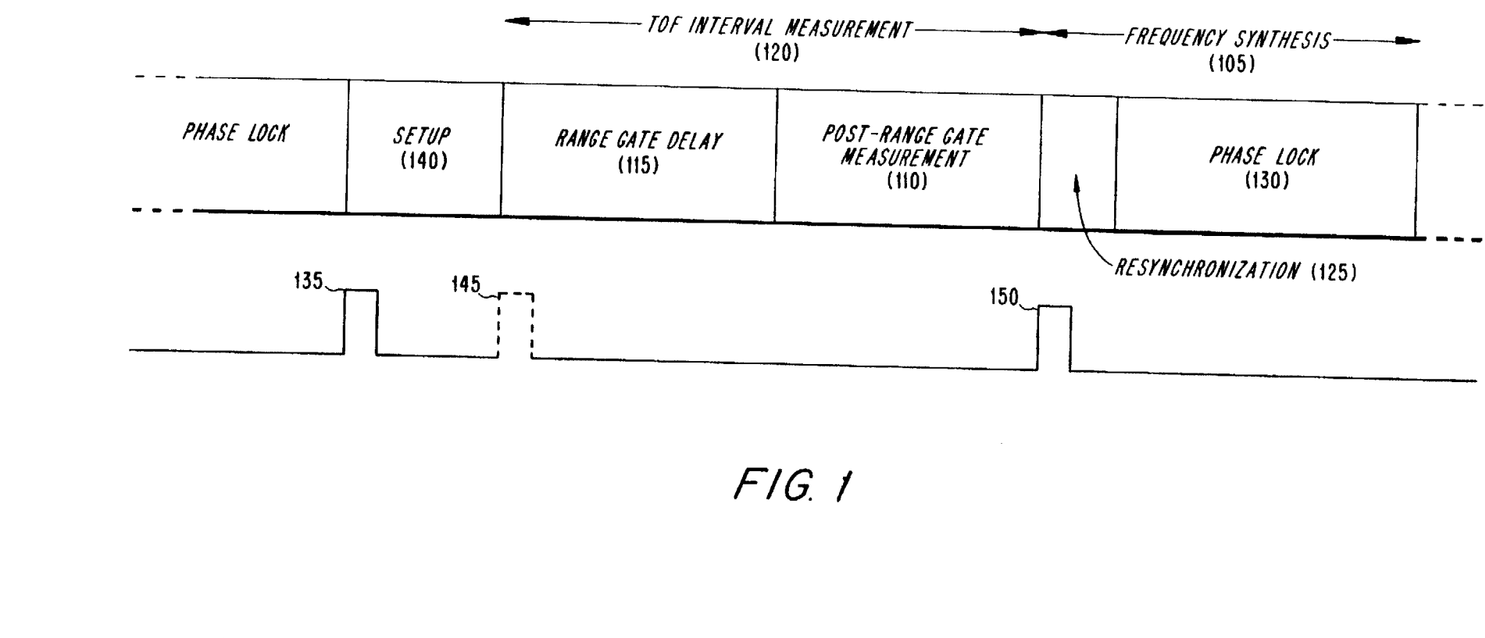
FIG. 1 is a timing diagram illustrating the time multiplexed method in accordance with the present invention.

FIG. 1 is a time domain representation of the time-of-flight (TOF) measurement functions executed in a first exemplary embodiment of the present invention. FIG. 1 shows that three primary functions are executed by the first exemplary embodiment: a frequency synthesis function 105, a post-range gate delay measurement function 110, and a range gate delay function 115. FIG. 1 also shows that the present invention employs a time multiplexed technique for executing the above-identified functions.

This time multiplexed technique is made possible by utilizing a single, high speed counter to accomplish all three primary functions, as will be explained in greater detail below. By using a single counter to accomplish all three functions, the number of high speed hardware devices, typically ECL devices, is significantly reduced.

Figure 2:
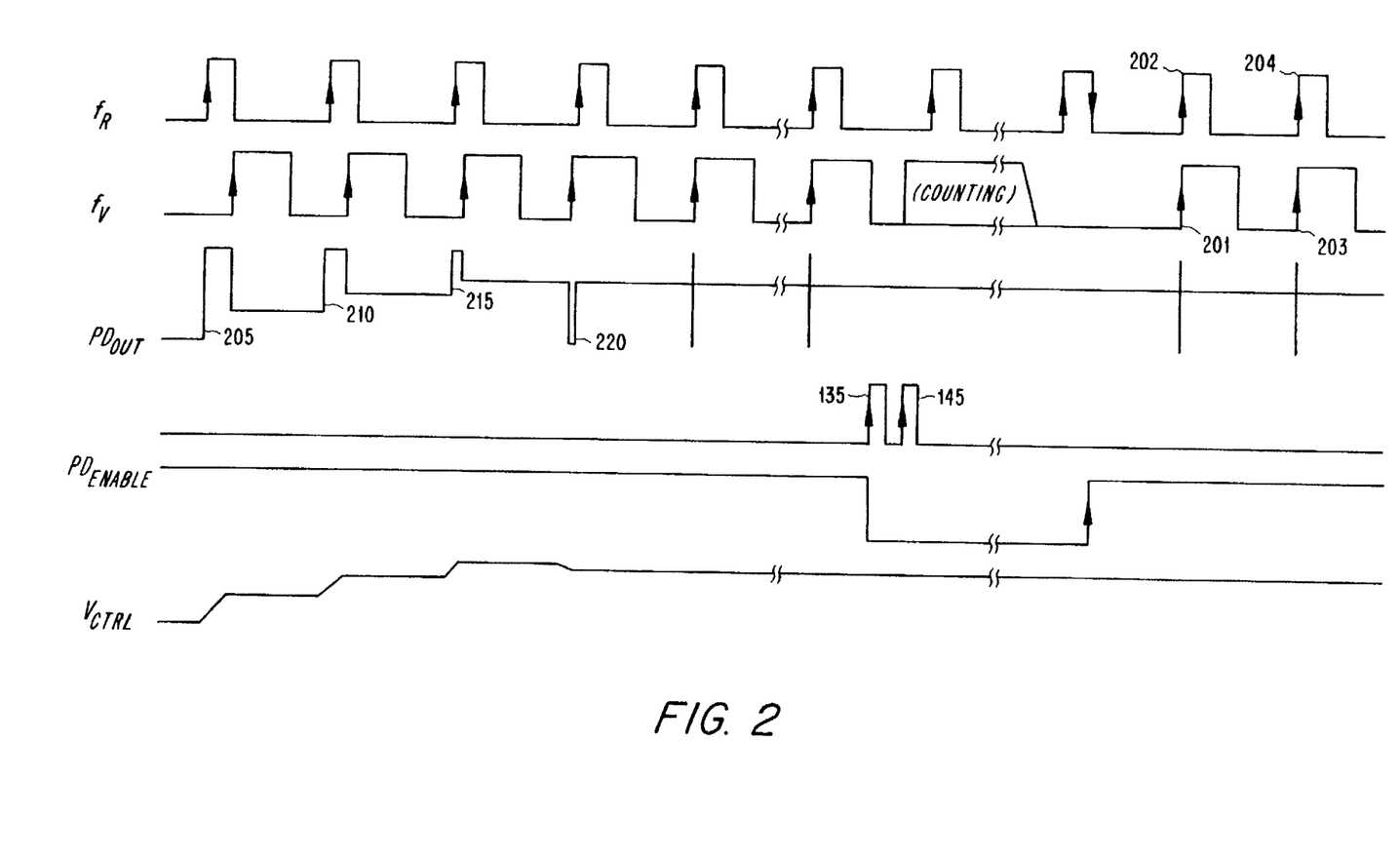
FIG. 2 is a timing diagram illustrating the frequency synthesis function in accordance with the present invention.

In accordance with one aspect of the present invention, as illustrated in FIG. 1, the sequence of events proceeds as follows. To assist with the understanding the following discussion, reference may also be made to FIG. 4, which depicts one embodiment of the invention. The present invention begins by executing a frequency synthesis function 105. The frequency synthesis function comprises two elemental subfunctions. The first frequency synthesis subfunction 105 is the synchronization subfunction 125, the purpose of which is to synchronize a voltage controlled oscillator (VCO) with a highly stable reference clock, herein referred to as the master reference oscillator. The VCO will be used for generating the high frequency clock pulses $f_{CLK}$ which are needed to measure the TOF interval. These components will be described in greater detail below. More particularly, synchronization 125 involves aligning the leading edges of a sequence of reference pulses $f_R$ with the leading edges of a sequence of timing pulses $f_V$, as illustrated by the alignment of the leading edges of pulses 201 and 203 with the leading edges of pulses 202 and 203 respectively, as shown in FIG. 2. The reference pulses $f_R$ are derived from the master reference oscillator and the timing pulses $f_V$ are derived from the clock pulses $f_{CLK}$. Both the reference pulses $f_R$ and the timing pulses $f_V$ are derived by dividing the frequency of the pulses generated by the master reference oscillator and the VCO respectively until the frequency of the two pulse trains are the same frequency. In addition, the timing pulses $f_V$ are derived, at least in part, by dividing the frequency of the clock pulses $F_{CLK}$ with a high speed counter that, in accordance with the invention, will be utilized for accomplishing other primary TOF measurement functions as will be described in greater detail below. One skilled in the art will readily understand that the sequence of reference pulses $f_R$ can be synchronized with the sequence of timing pulses $f_V$ using falling edges rather than leading edges or the falling edge of one pulse with the leading edge of another pulse. By first synchronizing the reference pulses $f_R$ with the timing pulses $f_V$, the time required to phase-lock the two pulse trains during the second frequency synthesis subfunction 130 is significantly reduced.

The second frequency synthesis subfunction is the phase-lock subfunction 130. During the execution of this subfunction, the reference pulses $f_R$ and the timing pulses $f_V$ are phase-locked with respect to each other. In accordance with the invention, a phase detection signal $PD_{out}$ is then generated, as shown in FIG. 2. The phase detection signal $PD_{out}$ indicates the phase differential, if any, between the timing pulses $f_V$ and the reference pulses $f_R$. More specifically, a phase detection signal $PD_{out}$ having a positive polarity indicates that the sequence of reference pulses $f_R$ is leading the sequence of timing pulses $f_V$, as illustrated by pulses 205, 210 and 215 in FIG. 2. A phase detection signal $PD_{out}$ having a negative polarity indicates that the sequence of reference pulses $f_R$ is lagging the sequence of timing pulses $f_V$, as illustrated by pulse 220 in FIG. 2. The pulse width of the phase detection signal $PD_{out}$ indicates the amount by which one sequence of pulses leads or lags the other sequence of pulses. A DC voltage $V_{CTRL}$, as illustrated in FIG. 2, is then generated as a function of the phase detection signal $PD_{out}$ and it is used to adjust the VCO, which in turn adjusts the phase of the timing pulses $f_V$. The frequency synthesis function described hereinabove is generally well known in the art.

Once the frequency synthesis function is complete (meaning that the output of the VCO, i.e., is now the desired signal for controlling the timing of measurements) a measurement trigger signal 135 is generated, as depicted in FIGS. 1 and 2. The invention then enters a setup phase 140, during which the VCO is decoupled from the master reference oscillator, so that the VCO begins operating in an open-loop mode. The timing of the signal $f_{clk}$ will remain substantially accurate for an amount of time necessary to perform the remaining measurement functions. In accordance with another aspect of the invention, during the setup phase 140, the same high speed counter described above is initialized with a value that represents a range gate delay. Typically, the range gate delay value is a negative value. This high speed counter is responsive to clock pulses $f_{CLK}$ generated by the VCO. Moreover, the same high speed counter was previously used during frequency synthesis as a frequency divider to generate the timing pulses $f_V$.

Once the setup phase 140 is complete, the invention issues a start count signal 145 which, in the exemplary embodiment, is synchronized with the transmission of a burst of energy (e.g., a burst of laser energy). The start count signal 145 causes the high speed counter to begin incrementing each time it receives a timing pulse from the VCO. In this embodiment, the high speed counter increments from the negative range gate delay value and continues to increment beyond zero. Upon expiration of the time period to be measured, which in the exemplary embodiment occurs when the return laser pulse is detected, a stop counter signal 150 is generated. The TOF interval measurement is then measured by the value at the output of the high speed counter, plus the absolute value of the range gate delay value. One skilled in the art will readily understand that the high speed counter may, in the alternative, be initialized with a positive range gate delay value, and the counter would then be subsequently decremented.

Range gating techniques are employed in TOF systems to minimize the likelihood that a TOF interval measurement will be based upon an erroneous laser pulse returning to the TOF system. For example, in some TOF applications, there is a high probability that the transmitted laser energy may reflect off objects other than the intended target. If these unintended objects are closer to the TOF system than the intended target, the laser pulses returning to the TOF system from the unintended objects will arrive before the laser pulses from the intended target. If the TOF system uses the laser pulses returning from the unintended objects for the purpose of measuring the TOF interval for the intended target then the TOF interval measurement and the resulting range measurement, will be incorrect. In this embodiment of the invention, the range gate function disables the stop count signal 150 until the range gate delay period expires. The range gate delay period expires when the counter transitions from a negative value to zero. The first return laser pulse to be received after the range gate delay period expires will cause a stop count signal to be issued.

On the other hand, if there is a very small probability that the laser energy will reflect off objects other than the intended target, range gating is probably not a necessary function. Therefore, a second aspect of the present invention omits the range gate function, and the high speed counter is simply initialized to zero during the setup phase 140.

A third aspect of the present invention provides enhanced range resolution, by introducing a random delay in transmitting the laser pulse, with respect to the sequence of clock pulses $F_{CLK}$, and by averaging numerous time interval measurements that include this random delay. Since the start count signal 145 is synchronized to the transmission of the laser pulse, the random delay also delays the generation of the start count signal 145. For this reason, the start count signal 145 is shown in a dashed-line format in FIG. 1.

Figure 3:
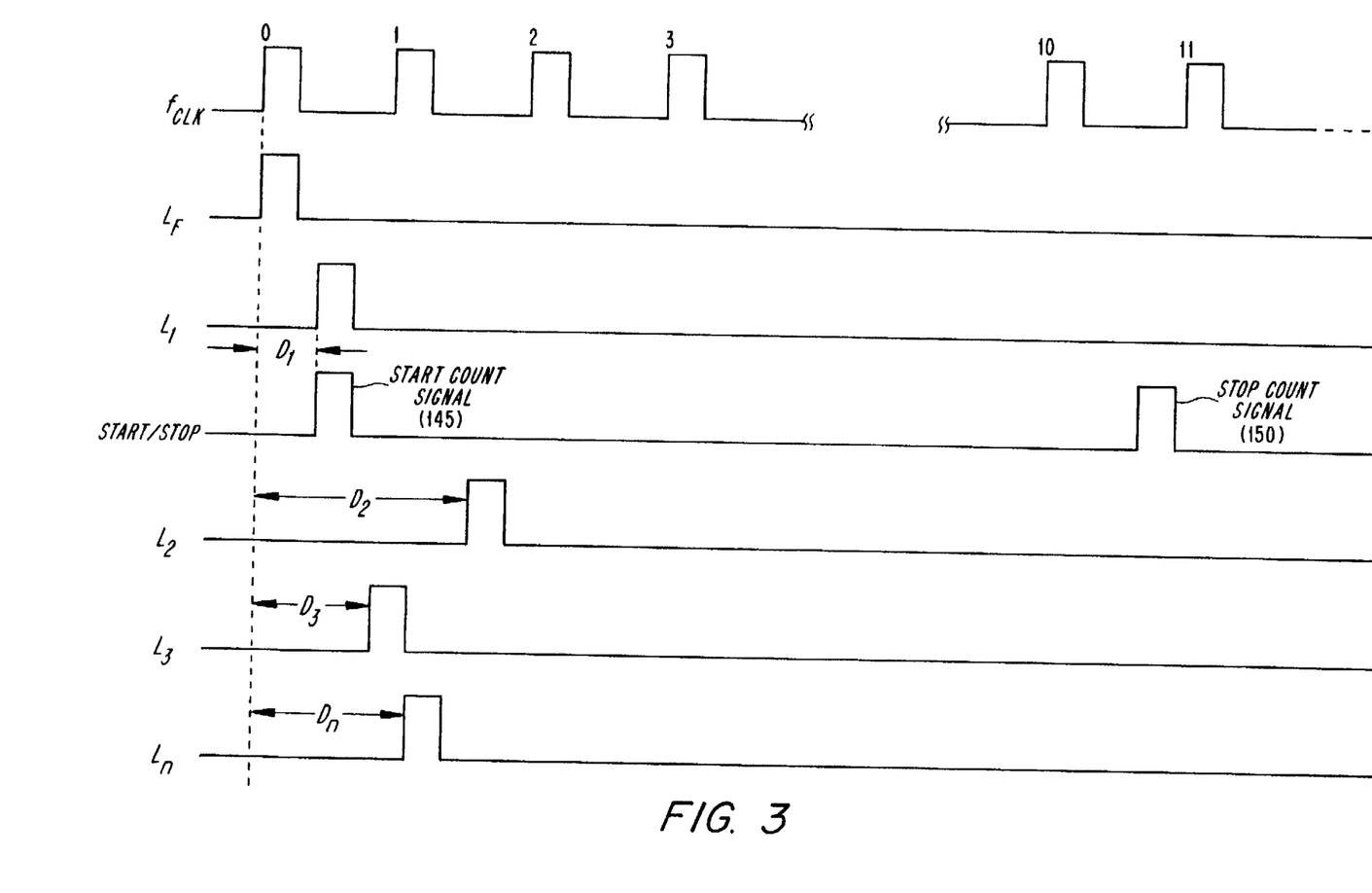
FIG. 3 is a timing diagram illustrating the high resolution time of flight averaging method in accordance with the present invention.

The timing diagram shown in FIG. 3 illustrates how this random delay technique works. The sequence of pulses $F_{CLK}$ again represents the timing pulses generated by the VCO. At the end of the setup phase 140, a laser fire signal $L_F$ is generated, wherein the laser fire signal $L_F$ is synchronized with the clock pulses $F_{CLK}$. However, instead of transmitting a laser pulse at the same instant that the laser fire signal $L_F$ is generated, a random delay signal is generated which causes a delay $D_1$, in the transmission of the laser pulse $L_1$. Consequently, the random delay signal also causes a delay in the generation of the start count signal 145. For example, if it takes a fraction over 10 clock cycles for the laser pulse $L_1$ to propagate to and from the intended target, the counter will read "10" when the stop count signal 150 is generated. This means that the fractional period above 10 clock cycles is lost. That is because the stop count signal 150 was generated before the VCO generated the 11th timing pulse, as illustrated in FIG. 3. If, however, "n" number of laser pulses are transmitted, each with a random delay between, in the exemplary embodiment, 0 and 2 clock cycles, non-inclusive, a certain percentage of the "n" number of time interval measurements will be "10" and a certain percentage of the "n" number of time interval measurements will be "11". By averaging all of the randomly generated time interval measurements, the invention is capable of recovering that fractional time period above 10 clock cycles. Thus, the invention is capable of achieving more accurate TOF interval measurements and range resolution results than the high speed VCO can otherwise provide. One of ordinary skill in the art will readily understand that there are numerous well known methods and techniques for generating random delay signals.

Figure 4:
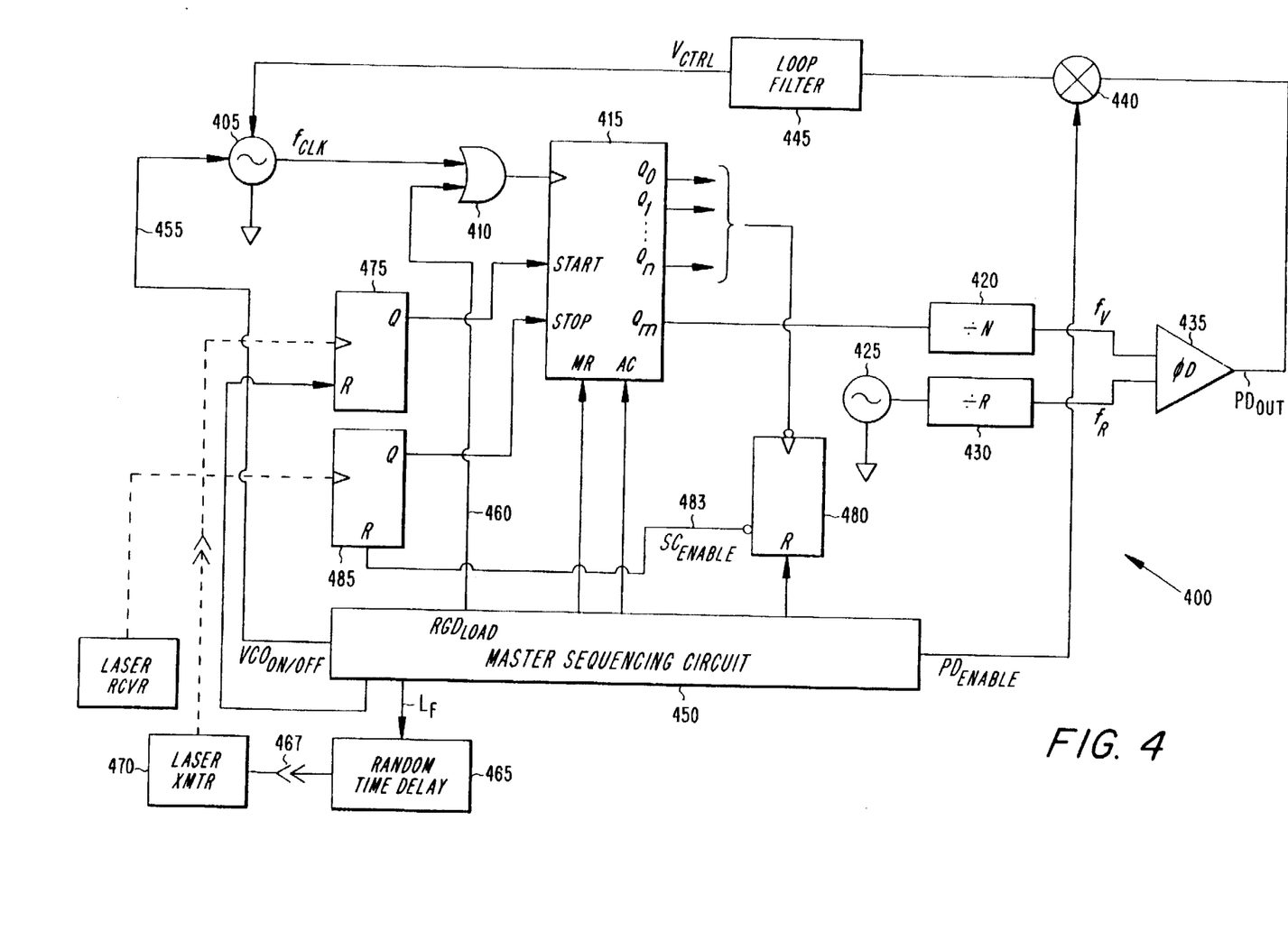
FIG. 4 is a circuit diagram of an exemplary embodiment of the present invention.

FIG. 4 shows an exclusively digital circuit 400 for implementing the third aspect of the present invention as described above. The following components are employed for executing the frequency synthesis function 105: the VCO 405, which is operating at a nominal frequency of 1.8 GHz in this exemplary embodiment; an OR gate 410; a high speed, 8-bit counter 415; a frequency divider 420, which divides by N, where N is 9 in the present embodiment; the master reference oscillator 425, which is operating at a frequency of 25 MHz; a frequency divider 430, which divides by R, where R is 32 in the present embodiment; a phase detector 435; a phase detection gating switch 440; a loop filter 445; and a master sequencing circuit 450, which is constructed using a field programmable logic array in this embodiment. One skilled in the art will readily understand that there are numerous other ways in which the master sequencing circuit 450 could be implemented. In addition, one skilled in the art will recognize that the components which are integral to the frequency synthesis function constitute a first circuit which is part of the larger digital circuit 400 shown in FIG. 4.

The digital circuit 400 begins executing the frequency synthesis, synchronization subfunction 125 by setting the master reset signal MR which resets the counter 415 and holds it and the VCO 405 at zero. The master sequencing circuit 450 monitors the sequence of reference pulses and waits for the falling edge of the next reference pulse, for example, the falling edge preceding reference pulse 202 in FIG. 2. In response to an occurrence of the falling edge of the next reference pulse, the master sequencing circuit 450 releases its hold on the counter 415 and the VCO 405 by resetting the master reset signal MR. This causes the counter 415 to begin counting, which subsequently generates a first in a sequence of timing pulses $f_V$, for example, timing pulse 201 illustrated in FIG. 2, whose rising edge closely corresponds in time with the rising edge of the reference pulse 202. The sequence of timing pulses $f_V$ and the sequence of reference pulses $f_R$ are now closely aligned.

The master sequencing circuit 450 then sets the $PD_{ENABLE}$ signal which causes the digital circuit 400 to begin executing the frequency synthesis, phase-lock subfunction 130 by dividing the frequency of the clock pulses $f_{CLK}$ until the frequency of the reference pulses $f_R$ and the timing pulses $f_V$ exhibit the same frequency and phase. In this exemplary embodiment, the frequency of the clock pulses $F_{CLK}$ is first divided by the 8-bit counter 415 (i.e., a divide-by 256 counter), and then by the N divider 420, where N is preferably 9. This results in a sequence of timing pulses $f_V$ with a frequency of 781.25 KHz. At the same time, the frequency of the reference pulses $f_R$ is divided by the R divider 430, where R is preferably 32. This results in a reference pulse frequency of 781.25 KHz. The two pulse trains, now having the same frequency, are fed into the phase detector 435 which outputs a phase detection signal $PD_{out}$, described above and illustrated in FIG. 2. The loop filter 445 then generates a VCO control signal $V_{CNTL}$, which is used to adjust the VCO 405 and, therefore, the frequency of the clock pulses $f_{CLK}$, as previously described.

Once the frequency synthesis function 105 is complete, as discussed above, a measurement trigger signal 135, internal to the master sequencing circuit 450, is generated, which in turn causes the master sequencing circuit 450 to reset the $PD_{enable}$ signal and simultaneously set the asynchronous count signal AC. Upon resetting the $PD_{enable}$ signal and setting the asynchronous count signal AC, the VCO 405 begins generating clock pulses $f_{CLK}$ in an open-loop manner (i.e., independent of the master reference oscillator 425), thus marking the end of the frequency synthesis phase and the beginning of the setup phase 140.

During the setup phase 140, the master sequencing circuit 450 initializes the counter 415 with the range gate delay value. The master sequencing circuit 450 accomplishes this by first setting the $VCO_{off}$ control signal 455. Then, the master reset signal MR is set, which causes a zero value to be loaded into the counter 415. Next, the asynchronous count signal AC is set and the master sequencer loads the counter 415 with the range gate delay value by generating a sequence of pulses $RGD_{LOAD}$. As previously stated, the range gate delay value is typically a negative number; therefore, the counter 415 will reflect a negative number after being initialized with the range gate delay value. Next, the master sequencing circuit 450 resets the $VCO_{off}$ signal so that the VCO again begins generating clock pulses $f_{CLK}$ in an open-loop mode. At the same instant, the master sequencing circuit 450 also resets the asynchronous count signal AC, thus preventing the counter 415 from responding to the clock pulses $F_{CLK}$ being generated by the VCO 405 until the counter 415 receives a start count signal 145.

As previously discussed, the TOF measurement phase actually begins with the generation of a laser fire signal $L_F$ which is synchronized to the rising edge of a timing pulse, for example, timing pulse "0" in FIG. 3. The laser fire signal $L_F$ causes the random delay generator 465 to generate a random delay signal 467. The random delay signal 467, in turn, causes the laser transmitter 470 to delay the transmission of the laser pulse. It was also previously mentioned that the transmission of the laser pulse and the generation of the start count signal 145 are synchronized; therefore, the start count signal 145 is similarly delayed due to the random delay signal 467.

Once the random delay period expires, as illustrated in FIG. 3, the laser transmitter 470 transmits a burst of laser energy and the start counter controller 475 generates the start count signal 145. The counter 415 begins counting with the rising edge of the next incoming timing pulse, for example timing pulse "1" in FIG. 3. The counter 415, previously initialized with a negative range gate delay value, eventually reaches zero. When the counter 415 transitions from a negative value to zero, the range gate controller responds by resetting the stop count enable signal $SC_{enable}$ 483. This has the effect of enabling the stop count controller 485. By enabling the stop count controller 485, the stop count controller 485 is now free to generate a stop count signal 150 when the laser receiver receives the next laser return pulse. As stated above, the TOF interval measurement will be equal to the value at the output of counter 415 when the stop count signal 150 is generated, plus the absolute value of the range gate delay value.

The TOF interval measurement is stored in memory (not shown). In this embodiment of the present invention, approximately 10,000 TOF measurements, each affected by a random delay signal 467, as described above, are taken and stored for post processing. The post processing hardware and software then averages these approximately 10,000 TOF measurements to arrive at a final TOF interval measurement having a resolution that is better than any of the individual TOF interval measurements. One of ordinary skill in the art will readily understand that the post processing functions described herein can be implemented using hardware and software techniques that are well known in the art.

In addition, it is important to note that a single high speed counter may be utilized to execute all three primary TOF functions. It may be used as a frequency divider for the clock pulses $f_{CLK}$ during the frequency synthesis phase; it may be used as a range gate delay register and counter to accomplish the range gate delay function 115; and it may be used as a high speed counter for the TOF interval measurement. By time multiplexing each of these TOF functions, the present invention minimizes the use of costly, high speed digital components otherwise required to achieve the excessively short TOF interval measurements and range resolutions that the present invention is capable of achieving.

Figure 5:
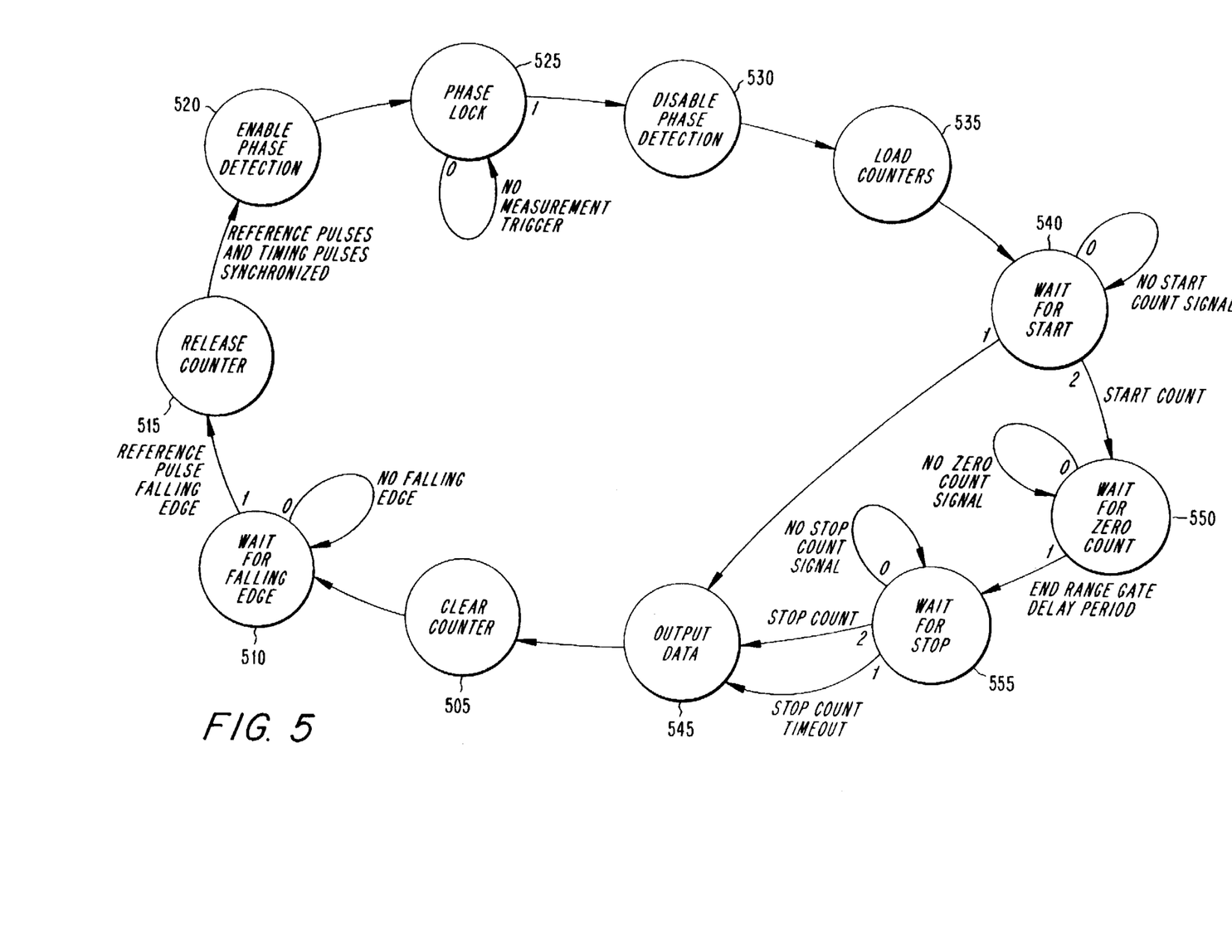
FIG. 5 is a state diagram of an exemplary embodiment of the present invention.

FIG. 5 shows a state diagram for the third aspect of the present invention described above. Beginning with the synchronization subfunction 125, the counter 415 is reset (i.e., cleared), as indicated by state 505. The counter 415 must then wait for the falling edge of the next reference pulse, as indicated by state 510. The counter 415 output remains at zero until the falling edge of the next reference pulse (i.e., when the reference pulses $f_R$ fall to zero), as indicated by the "0" path out of state 510. When the falling edge of the next reference pulse occurs, as indicated by the "1" path out of state 510, the counter 415 is released, as indicated by state 515, thus synchronizing the timing pulses $f_V$, generated by the VCO 405, with the reference pulses $f_R$.

Once synchronization is completed, phase detection is enabled, as indicated by state 520. After phase detection is enabled, the timing pulses $f_V$ begin phase-locking to the reference pulses $f_R$ (i.e., phase-locking the VCO 405 to the master reference oscillator 425), as indicated by state 525. As long as there is no measurement trigger signal 135 generated, as indicated by the "0" path out of state 525, the timing pulses $f_V$, continue to phase-lock with the reference pulses $f_R$. Once the measurement trigger signal 135 is generated, as indicated by the "1" path out of state 525, phase detection is disabled, as indicated by state 530.

The counter 415 is then loaded with the range gate delay value, as indicated by state 535. However, the counter 415 does not begin counting (i.e., does not begin timing the TOF interval) if a start count signal 145 is not received, as indicated by the "0" path out of state 540. If, after a predefined time interval (i.e., a start count timeout period), the start count signal 145 has not been received, as indicated by path "1" out of state 540, status information is downloaded for post processing, as indicated by state 545.

If a start count signal is generated within the start count timeout period, as indicated by the "2" path out of state 540, the counter 415 begins timing the TOF interval. The range gate controller 480 must then wait for the counter 415 to increment to zero, as indicated by the "0" path out of state 550. Once the counter reaches zero, as indicated by the "1" path out of state 550, the range gate controller marks the end of the range gate delay period by enabling the stop counter controller 485.

The counter 415 continues counting while waiting to receive a stop count signal 150, as indicated by the "0" path out of state 555. If, after a predefined period of time (i.e., a stop count timeout period), no stop count signal 145 is received, as indicated by the "1" path out of state 555, status information is downloaded for post processing, as indicated by state 545. However, if a stop count signal 145 is received within the allotted timeout period, as indicated by path "2" out of state 555, TOF interval measurement data, as well as status information are downloaded for post processing, as indicated by state 545.

Figure 6A:
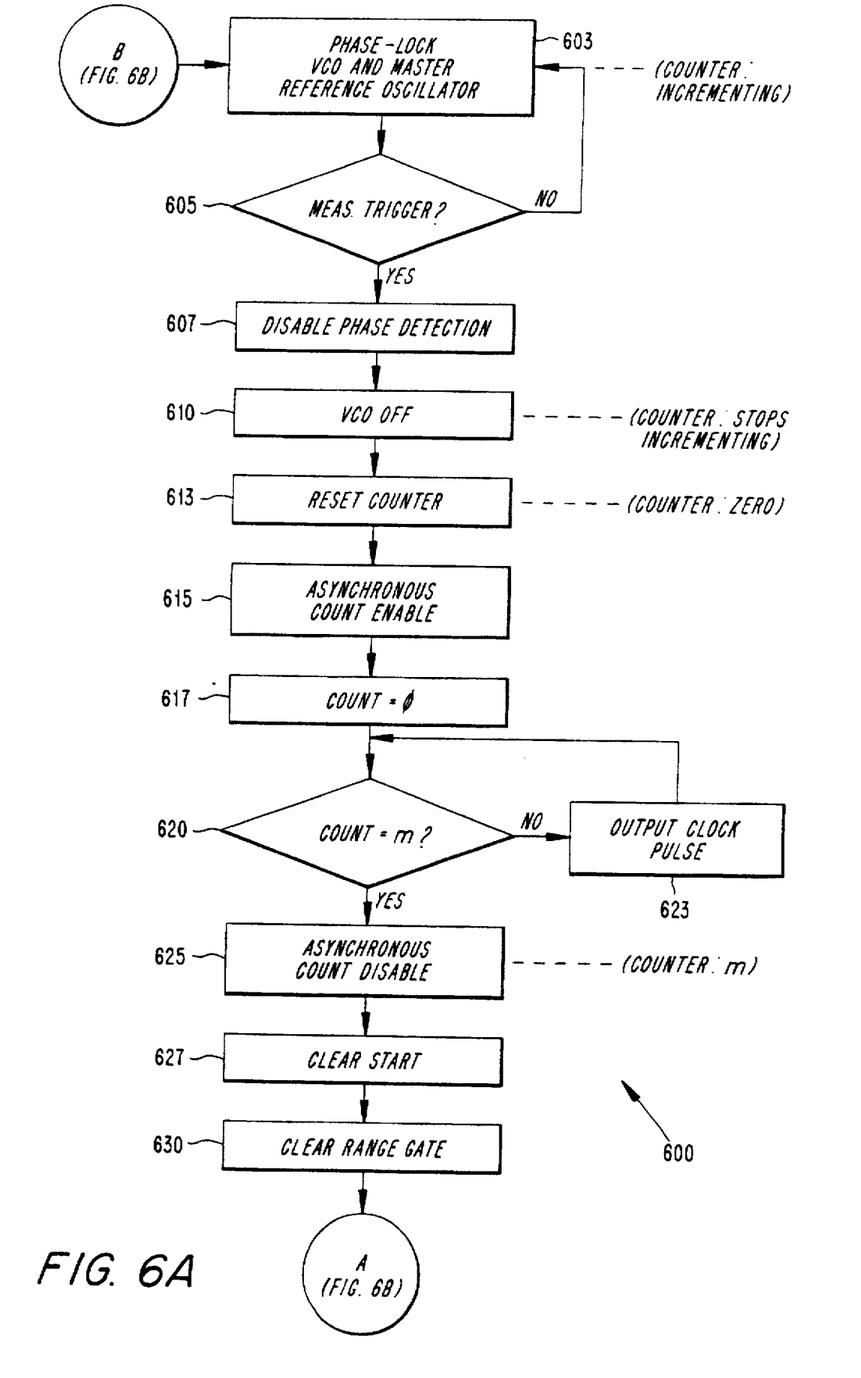
FIGS. 6A and 6B are flowcharts for an exemplary embodiment of the present invention.
Figure 6B:
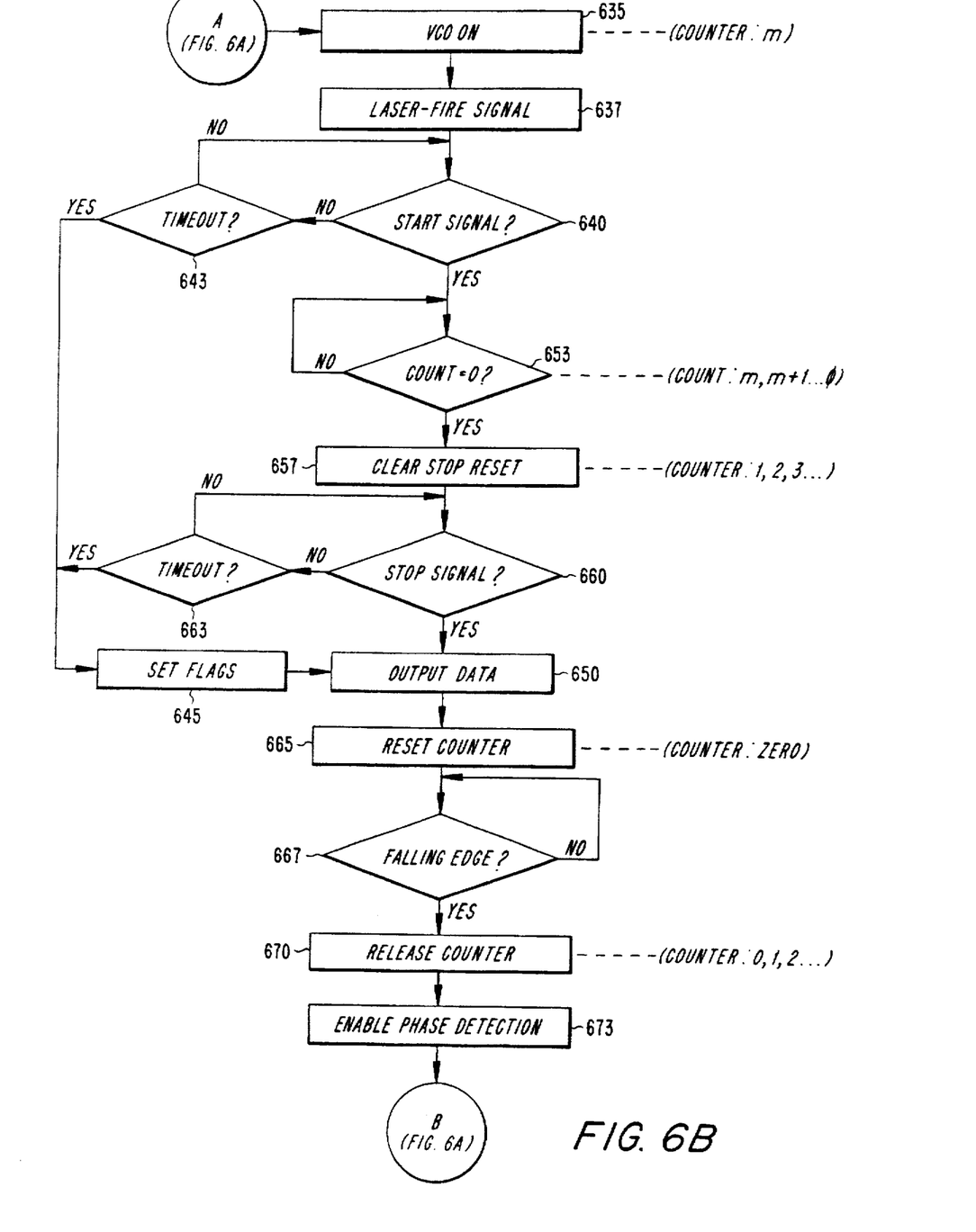

FIGS. 6a and 6b are flowcharts which together represent a detailed procedure 600 associated with the invention described above. The flowchart in FIG. 6a begins with the step of phase-locking the timing pulses $f_V$ with the reference pulses $f_R$ (i.e., phase-locking the VCO 405 with the master reference oscillator 425), as illustrated by block 603. The parenthetical information to the right of block 603 indicates that the counter 415 is freely incrementing during the phase-lock stage 130. The phase-lock phase 130 continues until a measurement trigger signal 135 is generated, in accordance with the NO path out of decision block 605. At the same instant the measurement trigger signal 135 is generated, as illustrated by block 607 and in accordance with the YES path out of decision block 605, phase detection is disabled (i.e., the $PD_{ENABLE}$ signal is reset), thus indicating the end of the phase-lock stage 130 and the beginning of the setup phase 140.

During the setup phase 140, and in accordance with the invention, the counter 415 is initialized with the range gate delay value. The detailed procedure for initializing the counter 415 with the range gate delay value is as follows. First, the master sequencing circuit 450 disables the VCO 405, as illustrated by block 610. The parenthetical information to the right of block 610 indicates that the counter 415 stops incrementing when the master sequencing circuit 450 disables the VCO 405. Second, the master sequencing circuit 450 resets the counter 415, as illustrated by block 613. The parenthetical information now indicates that the counter 415 contains a count of zero. Third, the asynchronous count signal AC is enabled, as illustrated by block 615. This will allow the master sequencing circuit 450 to continuously increment (or decrement) the counter 415 until the counter contains a count of m, wherein m represents the range gate delay value. More specifically, the master sequencing circuit 450 begins incrementing (or decrementing) the counter 450 from zero, as illustrated by block 617. If the counter 415 does not contain a count of m, in accordance with the NO path out of decision block 620, the master sequencing circuit 450 will generate an additional clock pulse to further increment (or decrement) the counter 415, as illustrated by block 623. Eventually, the counter 415 will contain the correct range gate delay value m, in accordance with the YES path out of decision block 620, and the asynchronous count signal AC will be reset, as illustrated by block 625. The parenthetical information to the right of block 625 indicates that the counter 415 now contains a count of m.

Also during the setup phase 140, the master sequencing circuit 450 sets the start counter controller 475, as illustrated by block 627, and the range gate controller 480, as illustrated by block 630. By setting the start counter controller 475, the counter 415 will begin clocking (i.e., counting) the TOF interval as soon as a start count signal 145 is received. By setting the range gate controller 480, the stop counter controller 485 will be prevented from generating a stop count signal 150 until after the counter 415 indicates that the range gate delay has elapsed (i.e., when the counter 415 increments from a value of m to a value of zero). Finally, the master sequencing circuit re-enables the VCO 405, as illustrated by block 635 in FIG. 6b, which causes the VCO to begin generating clock pulses. The parenthetical information to the right of block 635 indicates that the counter 415 remains at m counts until a start count signal 145 is relayed to the counter 415 by the start counter controller 475. This marks the end of the setup phase 140.

The master sequencing circuit 450 then generates a laser fire signal $L_F$, as illustrated by block 637, which in turn causes a random time delay generator 465 to randomly delay the transmission of the laser pulse and, consequently, the start count signal 145. If the start count signal 145 has not yet been received, in accordance with the NO path out of decision block 640, the digital circuit 400 will determine whether the start counter timeout period has expired, as illustrated by decision block 643. If the timeout period has not expired, in accordance with the NO path out of decision block 643, the digital circuit 400, and in particular, the counter 415 will continue to wait for the start count signal 145. If the timeout period does expire, in accordance with the YES path out of decision block 643, status and error flags are set, as illustrated by block 645, and downloaded for post processing, as illustrated by block 650.

If the start count signal 145 is received prior to the timeout period, in accordance with the YES path out of decision block 640, the counter 415 will immediately begin timing the TOF interval upon receiving the start count signal 145. As indicated by the parenthetical information to the right of decision block 653, the counter 415 begins incrementing from a count of m which represents the range gate delay period. As indicated by the NO path out of decision block 653, the range gate controller 480 continually monitors the counter 415 to determine whether the counter 415 contains a zero count, thus indicating the expiration of the range delay period. When the counter 415 does contain a zero count, in accordance with the YES path out of decision block 653, the range gate controller 480 will end the range gate delay period by enabling the stop counter controller 485, as illustrated by block 657.

The counter 415 continues to time the TOF interval while awaiting a stop count signal 150. If the stop count signal 150 has not yet been generated, in accordance with the NO path out of decision block 660, the digital circuit 400 will determine whether a predetermined timeout period for the stop count signal 150 has expired, as illustrated by decision block 663. If the timeout period has not yet expired, the counter will continue timing the TOF interval, in accordance with the NO path out of decision block 663. if the timeout period does expire before a stop count signal 150 is generated, in accordance with the YES path out of decision block 663, status and error flags will be set, as illustrated by block 645, and the information will be downloaded for post processing, as illustrated by block 650. If, however, the stop signal is generated before the expiration of the timeout period, in accordance with the YES path out of decision block 660, the counter 415 will stop timing the TOF interval and the TOF interval measurement data and status information will be downloaded for post processing, as illustrated by block 650. Outputting the TOF interval measurement data indicates the end of the TOF interval measurement phase and the beginning of a new frequency synthesis phase 105.

In order to prepare for a next measurement, the frequency synthesis phase 105 begins anew with the master sequencing circuit 450 resetting the counter 415, as illustrated by block 665. The parenthetical information to the right of block 665 indicates that the counter 415 now contains a count of zero. Next, the timing pulses $f_V$ and the reference pulses $f_R$ must be synchronized in accordance with the synchronization subfunction 125. As explained above, synchronization 125 is accomplished by continually holding the counter 415 at zero while awaiting the falling edge of the next reference pulse, as illustrated by the NO path out of decision block 667. When the falling edge of the next reference pulse is detected, in accordance with the YES path out of decision block 667, the master sequencing circuit 450 releases its hold on the counter 415, as illustrated by block 670, thus synchronizing the rising edges of the timing pulses $f_V$ and the reference pulses $f_R$. The parenthetical information to the right of block 670 indicates that the counter will now begin incrementing in response to the clock pulses $f_{CLK}$ which are generated by the VCO 405. The master sequencing circuit 450 then enables phase detection (i.e., sets the $PD_{ENABLE}$ signal), as illustrated by block 673, wherein the circuit 400 once again attempts to phase-lock the timing pulses $f_V$ with the reference pulses $f_R$. The aforementioned process continuously repeats for each TOF interval measurement.

The reason for repeating the frequency synthesis phase 105 before each measurement is to ensure that the $F_{CLK}$ pulse will provide accurate timing for the measurement. It will be recalled that, when the actual measurement is taking place, the VCO is in a free-running mode. Consequently, the frequency of $f_{CLK}$ would eventually drift by an intolerable amount if the frequency synthesis phase 105 were not repeated.

Although only the preferred embodiments are specifically illustrated and described herein, it will be appreciated that many modifications and variations of the present invention are possible in light of the above teachings and within the purview of the appended claims without departing from the spirit and intended scope of the invention. For example, the present invention may be used in conjunction with TOF systems that use forms of energy other than laser energy to determine the range of a desired target. Moreover, the invention may be used to measure the duration of time periods that are unrelated to TOF systems.

What is claimed is:

1. A method for measuring a time interval, comprising the steps of:

using a counter in a first circuit to synthesize a measurement clock having a predetermined frequency;

disconnecting the counter from the first circuit;

applying the measurement clock to the counter and starting counter operation in response to a start signal;

stopping counter operation in response to a stop signal; and using an output of the counter to measure the time interval between the start signal and the stop signal.

2. The method of claim 1, wherein the step of applying the measurement clock to the counter and starting counter operation in response to a start signal comprises the steps of:

initializing the counter to a predetermined value representing a predetermined time period; and applying the measurement clock to the counter and starting counter operation in response to a start signal.

3. The method of claim 2 wherein:

the predetermined value is a range gate delay; and the step of stopping counter operation in response to the stop signal is inhibited until the output of the counter indicates expiration of the predetermined time period.

4. The method of claim 1, further comprising the step of delaying the start signal by a random time delay.

5. The method of claim 4 wherein the steps of synthesizing the measurement clock, disconnecting the counter, applying the measurement clock to the counter, delaying the start signal, starting counter operation in response to the start signal, stopping counter operation in response to the stop signal, and using the output of the counter to measure the time interval are repeated a predetermined number of times, and further comprising the step of averaging the measured time intervals to determine a final measurement period.

6. A method for measuring a time interval, comprising the steps of:

synthesizing a measurement clock having a predetermined frequency;

initializing a counter to a predetermined value representing a range gate delay;

applying the measurement clock to the counter and starting counter operation in response to a start signal;

stopping counter operation in response to a stop signal; and using an output of the counter to measure the time interval, wherein the step of stopping counter operation in response to the stop signal is inhibited until the output of the counter indicates expiration of the range gate delay.

7. The method of claim 6, further comprising the step of delaying the start signal by a random time delay.

8. The method of claim 7, wherein the steps of synthesizing the measurement clock, initializing the counter, applying the measurement clock to the counter, delaying the start signal, starting counter operation in response to the start signal, stopping counter operation in response to the stop signal, and using the output of the counter to measure the time interval are repeated a predetermined number of times, and further comprising the step of averaging the measured time intervals to determine a final measurement period.

9. The method of claim 6, further comprising the steps of:

transmitting a burst of energy; and receiving the transmitted burst of energy, wherein the start signal is synchronized with the transmitted burst of energy and the stop signal is synchronized with the received burst of energy.

10. The method of claim 9, wherein said energy is laser energy.

11. The method of claim 9, wherein said energy is an electrical impulse.

12. The method of claim 9, wherein said energy is a sound wave.

13. The method of claim 12, wherein said sound wave is an ultrasound wave.

14. An apparatus for measuring a time interval comprising:

counter means for dividing a clock frequency in a first circuit to synthesize a measurement clock;

means for disconnecting said counter means from the first circuit;

means for applying the measurement clock to said counter means;

first control means for starting a counter operation in response to a start signal;

second control means for stopping the counter operation in response to a stop signal; and means for using an output of said counter means to measure the time interval between the start signal and the stop signal.

15. The apparatus of claim 14, wherein said means for applying the measurement clock to said counter means comprises:

means for initializing the counter to a predetermined value representing a predetermined time period; and means for applying the measurement clock to said counter means.

16. The apparatus of claim 15, further comprising:

third control means for inhibiting said second control means until the output of said counter means indicates expiration of the predetermined time period, wherein the predetermined value is a range gate delay.

17. The apparatus of claim 14, further comprising means for delaying the start signal by a random time delay.

18. The apparatus of claim 17 further comprising:

means for repeatedly measuring the time interval; and means for averaging the measured time intervals to determine a final measurement period.

19. An apparatus for measuring a time interval comprising:

means for synthesizing a measurement clock having a predetermined frequency;

means for initializing a counter to a predetermined value representing a range gate delay;

means for applying the measurement clock to the counter;

first control means for starting counter operation in response to a start signal;

second control means for stopping counter operation in response to a stop signal;

means for using an output of the counter to measure the time interval; and third control means for inhibiting operation of the second control means until the output of the counter indicates expiration of the range gate delay.

20. The apparatus of claim 19 further comprising means for delaying the start signal by a random time delay.

21. The apparatus of claim 20 further comprising:

means for repeatedly measuring the time interval; and means for averaging the measured time intervals to determine a final measurement period.

22. The apparatus of claim 19, further comprising:

transmitter means for transmitting a burst of energy; and receiver means for receiving the transmitted burst of energy, wherein the start signal is synchronized with said transmitter means and the stop signal is synchronized with said receiver means.

23. The apparatus of claim 22, wherein said transmitter means is a laser transmitter, said receiver means is a laser receiver, and the burst of energy is laser energy.

24. The apparatus of claim 22, wherein said energy is an electrical impulse.

25. The apparatus of claim 22, wherein said energy is a sound wave.

26. The apparatus of claim 25, wherein said sound wave is an ultrasound wave.

* * * * *